United States Patent [19]

Pace et al.

[11] Patent Number: 4,904,157

[45] Date of Patent: Feb. 27, 1990

[54] AIRCRAFT PROPELLER ASSEMBLY WITH BLADE PITCH RESET FOR GROUND IDLE

[75] Inventors: Loy D. Pace; Donald C. Stackhouse; Earl W. Jones; Dennis S. Zimpfer, all of Piqua, Ohio

[73] Assignee: Hartzell Propeller Inc., Piqua, Ohio

[21] Appl. No.: 274,466

[22] Filed: Nov. 21, 1988

[51] Int. Cl.⁴ ............................................. B64C 11/40
[52] U.S. Cl. ...................................... 416/46; 416/48; 416/49
[58] Field of Search .................. 416/46, 48, 49, 25, 416/47, 153, 154

[56] References Cited

U.S. PATENT DOCUMENTS

| | | | |
|---|---|---|---|
| 2,694,459 | 11/1954 | Biermann | 416/137 X |
| 3,167,131 | 1/1965 | Voisard | 416/154 |
| 3,249,159 | 5/1966 | Biermann | 416/45 |
| 3,261,405 | 7/1966 | Andrews | 416/48 X |
| 3,380,535 | 4/1968 | Biermann | 416/46 |
| 3,389,640 | 6/1968 | Best et al. | 91/366 |
| 3,551,069 | 12/1970 | Morris | 416/46 X |
| 3,575,529 | 4/1971 | Biermann | 416/48 |
| 4,097,189 | 6/1978 | Harlamert | 416/46 |
| 4,648,798 | 3/1987 | Voisard | 416/48 |
| 4,650,402 | 3/1987 | Jones, Jr. et al. | 416/157 R |

Primary Examiner—Everette A. Powell, Jr.
Attorney, Agent, or Firm—Jacox & Meckstroth

[57] ABSTRACT

An aircraft propeller has adjustable pitch blades which are reset from a low pitch in-flight idle position to a lower pitch ground idle position by a beta feedback and reset mechanism. The reset mechanism includes a set of cam elements supported for movement in response to rotation of the blades and positioned to engage a follower plate adjustably mounted on the beta feedback control rods.

18 Claims, 2 Drawing Sheets

AIRCRAFT PROPELLER ASSEMBLY WITH BLADE PITCH RESET FOR GROUND IDLE

BACKGROUND OF THE INVENTION

The present invention relates to a rescheduling or reset mechanism for use on an aircraft propeller assembly having four or more blades and usually driven by a gas turbine engine. Such aircraft propeller assemblies and control systems are disclosed, for example, in U.S. Pats. No. 2,694,459, 2,986,222, 3,057,140, 3,249,159, 3,380,535, 3,575,529, 4,097,189 and U.S. Pat. No. 4,650,402 which are owned by the Assignee of the present invention and the disclosures of which are herein incorporated by reference.

In general, the pitch of the propeller blades is changed by varying the oil pressure to the hydraulic cylinder and piston projecting forwardly from the propeller hub and connected by crank arms or links to the bases of the propeller blades. Oil from the engine is increased in pressure by a pump in the propeller governor and is supplied to the propeller hub and piston through an axial oil passage in the engine shaft. Usually, the piston is spring biased to a rear position, and the springs cooperate with twisting movements produced by blade counterweights for moving the propeller blades to a feather position. Oil pressure moves the piston forwardly to change the blade pitch through a high pitch and low pitch to a reverse pitch.

In normal in-flight operation, the blade angle or pitch is controlled by the governor at all times. However, when the governor attempts to reduce the blade pitch below a predetermined low or fine pitch setting, the piston picks up a set of axially extending rods of a beta feedback mechanism. The rearward ends of the rods are connected to a feedback collar which receives a sliding carbon block mounted on one end portion of a feedback lever. The lever is pivotally supported by the actuating element of a beta valve connected to control hydraulic fluid to the cylinder and piston. The opposite end of the lever is connected by a power control cable to a pilot operated power lever in the cockpit of the aircraft. The beta valve is designed so that further axial forward movement of the piston and feedback rods and collar will shut off the supply of high pressure oil to the propeller piston, thus preventing any further pitch change beyond the in-flight idle position. However, if the governor senses an overspeed condition, the governor remains effective to reduce the oil pressure which causes the spring to produce an increase in the blade angle or pitch.

In aircraft propellers having four or more blades, there are certain operating placards which restrict operation of the propeller within a predetermined operating range, for example, in a range of 900–1200 rpm, so that the propeller avoids operating in an undesirable reactionless vibration mode. To avoid this mode when the aircraft lands, it is desirable to reset or reduce the pitch of the propeller blades from the inflight idle setting or position to an on-ground idle setting or position so that the propeller unloads the engine and operates at a higher rpm.

Various electrical and/or pneumatic devices have been connected to the beta valve control linkage to produce a resetting or rescheduling of the propeller blades from the in-flight idle position to the ground idle position. The change in the beta valve causes the underspeeding governor to provide sufficiently high pressure oil to the propeller piston for decreasing the blade pitch to the on-ground idle position. However, these devices have limitations on the amount of pitch decrease and are usually difficult to install, adjust and maintain. Another form of blade pitch rescheduling or reset mechanism is disclosed in U.S. Pat. No. 4,643,798 which also discusses the problems associated with operating a four blade propeller within the reactionless mode. The mechanism disclosed in this patent uses a balancing spring and lost motion system which is incorporated on the beta feedback control mechanism.

SUMMARY OF THE INVENTION

The present invention is directed to a variable pitch aircraft propeller assembly having a hydraulically actuated pitch change system and a beta feedback control system and which incorporates an improved, simplified and dependable reset mechanism for decreasing the pitch of the propeller blades to a precise in-flight idle position during approach and landing and then to a precise on-ground idle position. The improved reset mechanism of the invention is located on the propeller assembly, is conveniently adjustable externally of the propeller assembly, is positive and reliable in operation, minimizes maintenance and may be easily installed on many existing propeller assemblies.

In accordance with a preferred embodiment of the reset mechanism constructed in accordance with the invention, a cam follower plate is adjustably mounted on the forward end portions of the beta control rods and carries a cam engaging roller for each of the propeller blades. A cam element or plate is adjustably mounted on each of the propeller blade counterweights, and the cam plates are positioned to engage the follower rollers when the blades are rotated to a predetermined in-flight idle pitch for aircraft descent and landing. A slight forward movement of the follower plate and beta control rods by the cam plates is effective to close the beta valve when the desired in-flight idle pitch is established.

After the aircraft lands, the beta valve is opened slightly either automatically or by movement of the pilot power level control so that the blade pitch resets or reduces to a ground idle pitch position which is established when the hydraulic piston picks up adjustable nuts on the beta control rods and again closes the beta valve. The position of the follower plate is conveniently adjustable on the beta control rods, the cam plates are conveniently adjustable on the blade counterweights, and the piston pickup nuts on the beta control rods are conveniently adjustable so that the entire reset mechanism may be precisely adjusted or finely tuned externally of the propeller assembly to obtain precision blade pitch positions without requiring any disassembly of the propeller.

Other features and advantages of the invention will be apparent from the following description, the accompanying drawings and the appended claims.

DESCRIPTION OF THE PREFERRED EMBODIMENT

Figure 1:
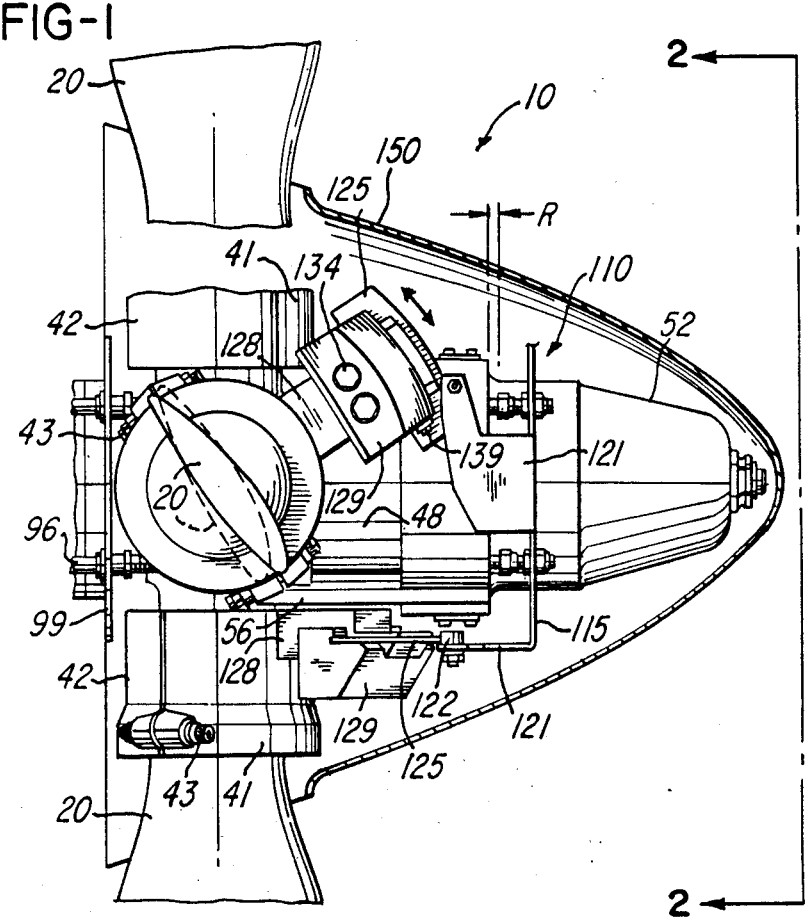
FIG. 1 is an elevational view of a propeller assembly with a reset mechanism constructed in accordance with the invention and with portions broken away.
Figure 2:
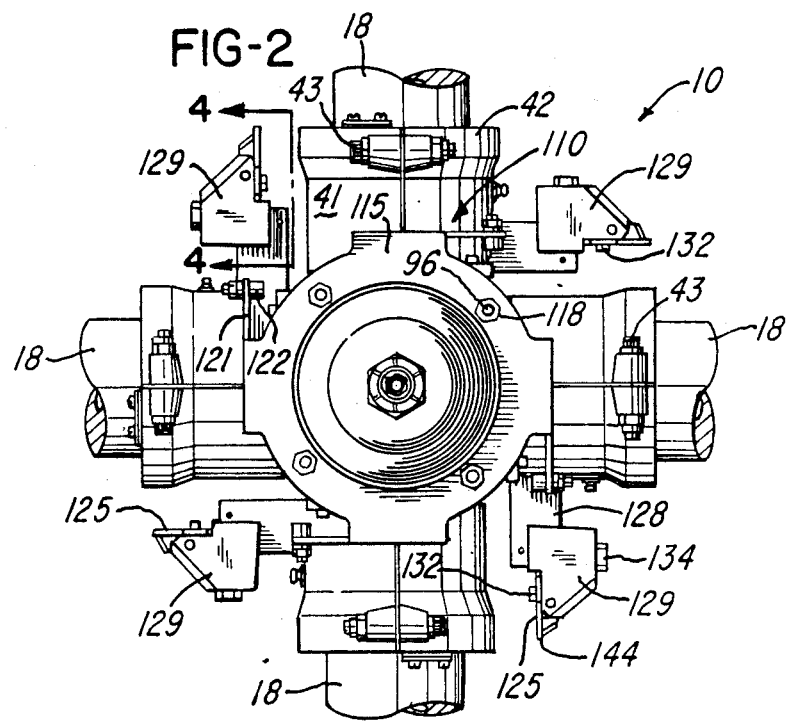
FIG. 2 is an axial view of the propeller assembly as taken generally on the line 2—2 of FIG. 1.
Figure 3:
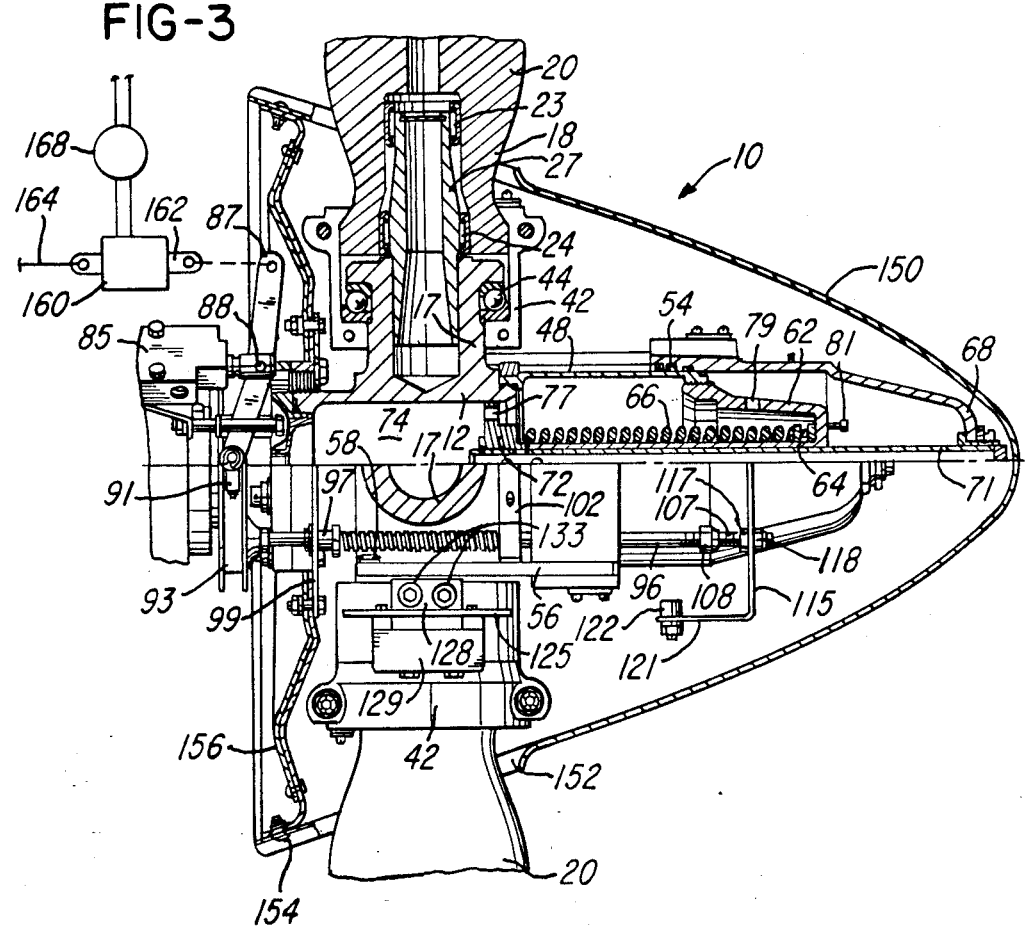
FIG. 3 is a fragmentary section of the propeller assembly shown in FIGS. 1 and 2 with the upper half shown in section in the blade reverse position and the lower half shown in the elevation in the blade feather position.

FIGS. 1-3 illustrate an aircraft propeller assembly 10 which includes a hub 12 having a set of four circumferentially spaced and radially projecting tubular portions 17, and each portion 17 is coupled to the base portion 18 of a radially extending propeller blade 20. Each of the propeller blades 20 may be constructed of composite materials, for example, as disclosed in U.S. Pat. No. 4,524,499 which is assigned to the Assignee of the present invention and the disclosure of which is incorporated by reference. The base portion 18 of each propeller blade is rotatably supported by a set of needle bearings 23 and 24 mounted on a pilot tube 27 which projects into the corresponding tubular hub portion 17. A set of mating collar sections 41 and 42 are clamped to the base portion 18 of each blade 20 by a set of bolts 43 (FIG. 2) and a set of inner clamp screws (not shown), and confine an antifriction bearing 44 which cooperates to support the blade for rotation, as disclosed in detail in above-mentioned U.S. Pat. No. 4,524,499.

Referring to FIG. 3, a hydraulic cylinder 48 projects axially or forwardly from the forward hub section 12 and slidably supports a cup-shaped external piston 52 having an annular base portion which confines a resilient sealing ring 54. The base portion of the piston 52 also has lugs which are connected by a set of pivotal link members 56 to eccentric pivot screws 58 threaded into the collar sections 42 to provide for simultaneous rotation of the propeller blades 20 in response to axial movement of the piston 52.

The cylinder 48 has a cup-shaped forward end portion 62 which supports an axially extending center tube 64 surrounded by a compression spring 66. The piston 52 includes a forward end portion 68 which carries an axially extending tube 71 slidably supported within the tube 64. An annular collar 72 is mounted on the rearward end portion of the tube 71 and is slidably supported within a cylindrical chamber 74 defined within the hub 12. Pressurized hydraulic fluid or oil is supplied to the chamber 74 and into the cylinder 48 through circumferentially spaced holes 77 within the collar 72, and the oil is supplied to the chamber within the piston 52 through circumferentially spaced holes 79 within the cylinder end portion 62.

The angular position or pitch of the propeller blades 20 is variable from a feather position when the piston 52 has moved to its rearmost position as shown in the bottom half of FIG. 3. When pressurized oil is introduced into the piston 52, the piston 52, tube 71 and collar 72 move forwardly to compress the spring 66 and change the pitch of the propeller blades 20 to a reverse pitch position as shown in the upper half of FIG. 3 where the piston 52 is in its full forward position. An adjustment screw 81 (FIG. 3) determines the precise rearward position of the piston 52 and the corresponding feather position of the propeller blades 20.

As mentioned above, high pressure oil is supplied to the chamber 74 and to the piston 52 through a passage which is connected to a governor controlled pump through an engine mounted beta valve 85 (FIG. 3) located at the rear of the propeller hub. A beta feedback lever 87 has a center portion pivotally connected to the valve actuator by a pivot pin 88. An inner portion of the lever 87 is pivotally connected to a slide block 91 which project into a spool-like beta feedback collar 93. The collar is supported for rotation with the propeller by the rearward end portions of a set of four beta feedback rods 96. The rods 96 are slidably supported by bushings 97 mounted within a radial support plate 99 and are also slidably supported by a guide collar 102 which surrounds the base portion of the cylinder 48 threaded onto the hub 12. The feedback rods 96 project forwardly through clearance holes within the base portion of the piston 52 and have threaded end portions 107 which receive corresponding adjustable nuts 108.

In accordance with the present invention, a rescheduling or reset mechanism 110 includes a cam follower plate 115 which surrounds the piston 52 and is adjustably mounted on the forward end portions of the rods 96 by a set of nuts 117 and 118. As shown in FIG. 1, the follower plate 115 has four right angle flanges or ears 121 which project rearwardly and carry corresponding rollers 122. The reset mechanism 110 also includes a set of reset cam members or plates 125 (FIG. 4) which are adjustably mounted on corresponding propeller blade counterweights 128 and weight elements 129 by a set of screws 132.

The counterweights 128 are secured to corresponding collar sections 42 by screws 133, and a pair of screws 134 (FIG. 1) secure each weight element 129 to the corresponding counterweight 128. Each cam plate 125 has a set of slots 137 for receiving the screws 132 to permit lateral or circumferential adjustment of the cam plate when the screws 132 are loosened. An adjustment screw 139 (FIG. 1) is temporarily threaded into each weight element 129 and engages the corresponding plate 125 for precisely adjusting the cam plate in a lateral direction. After adjustment is completed, the screws 132 are tightened, and the screws 139 are removed.

Figure 4:
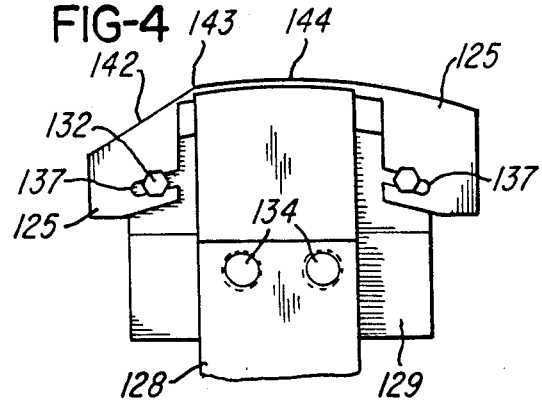
FIG. 4 is an enlarged fragmentary view taken generally on the line 4—4 of FIG. 2.

As shown in FIGS. 1 and 4, each cam plate 125 has a straight cam surface 142 which connects at an edge 143 with a part-circular surface 144 having a uniform radius. As shown in FIG. 3 the base portions 18 of the propeller blades 20, the collar sections 41 and 42, the counterweight members 128 and 129, the hub 12, the cylinder 48 and piston 52 and the entire rescheduling or reset mechanism 110 are enclosed within a dome-shaped spinner cover 150. The cover 150 has openings 152 for the propeller blades 20, and the rearward end portion of the spinner is removably secured by a set of peripherally spaced screws 154 to an annular bulkhead 156 mounted on the support plate 99.

Referring to FIG. 3, a solenoid 160 has an armature 162 connected to the outer end portion of the beta feedback lever 87, and the solenoid is connected to a power control cable 164 which extends from the power lever (not shown) in the aircraft cockpit. The solenoid 160 is controlled by a ground sensing switch 168, such as a switch which is mounted on the retractable landing gear for the aircraft and is actuated when the wheels engage the ground.

In operation of a propeller assembly incorporating a reset mechanism 110 in accordance with the invention, when the pilot is making an approach, the pilot moves the power lever in a direction which opens the beta valve 85 so that high pressure oil moves the piston 52 forwardly to reduce the pitch of the propeller blades 20. As the pitch of the blades decreases, the cam surfaces 142 engage the rollers 122 on the cam follower plate 115 so that the follower plate 115, beta rods 96 and feedback collar 93 move forwardly by a small distance. When the cam plate rollers 122 approach the edges 143 on the cam plates 125, the follower plate 115, rods 96 and collar 93 have moved forwardly by a distance sufficient to close the beta valve 85 so that no further oil enters the cylinder 48 and the pitch of the blades 20 remains at the inflight idle position as shown by the solid lines in FIG. 1.

When the landing gear engages the ground, the switch 168 closes to energize the solenoid 160 for retracting the armature 162 to pivot the lever 87 by a few degrees sufficient to open the beta valve 85 again. As additional high pressure oil flows into the cylinder 48, the piston 52 moves forwardly causing a further reduction in the pitch of the propeller blades 20. After the piston 52 moves through a blade reset distance R (FIG. 1), the piston engages the nuts 108 on the feedback rods 96 and continues to move the rods 96 and collar 93 forwardly by a slight amount which is sufficient to pivot the lever 87 and again close the beta valve 85. At this point, the blades 20 are positioned at the ground idle position as shown by the dotted lines in FIG. 1.

While the blade reset operation is performed automatically when the aircraft landing gear engages the ground by actuation of the solenoid 160, the reset operation may also be accomplished by the pilot moving the power lever pass a detent which causes the beta feedback lever 87 to pivot and open the valve 85 for supplying additional high pressure oil to the cylinder 48 for moving the piston 52 through the reset distance R. When the blades 20 are rotating from their in-flight idle positions to their on-ground idle positions, the cam follower rollers 122 roll along the uniform radius surfaces 144 on the cam plates 125. Thus the cam follower plate 115 and feedback rods 96 do not move forwardly relative to the hub sections to close the beta valve 85 until the piston 52 engages the nuts 108 on the rods 96.

From the drawings and the above description, it is apparent that an aircraft propeller assembly incorporating a blade pitch reset mechanism constructed in accordance with the present invention, provides desirable features and advantages. For example, the blade pitch for the in-flight idle position may be precisely and conveniently selected by adjusting the position of the follower plate 115 on the feedback rods 96 and/or by adjusting the position of the cam plates 125 in a circumferential direction relative to the blade counterweights 128. In addition, the pitch of the propeller blades at the on-ground idle position may be precisely selected by adjusting the nuts 108 on the rods 96 to establish when the piston 52 picks up the nuts 108. All of these adjustments may be conveniently made externally of the propeller assembly and after only removing the spinner cover 150.

It has also been found that the reset mechanism of the invention is positive and reliable in operation and requires the minimum of maintenance in addition to being inexpensive and simple in construction. The reset mechanism may also be conveniently installed on many existing propeller assemblies without any significant disassembly. The automatic actuation of the beta feedback lever 87 by the solenoid 160 to open the beta valve 85 for performing the reset operation when the aircraft lands, is also desirable in that all of the propeller assemblies on the aircraft are simultaneously reset which assures a uniform and balanced reduction of the thrust produced by the propeller assemblies.

While the propeller assembly herein described constitutes a preferred embodiment of the invention, it is to be understood that the invention is not limited to this precise propeller assembly, and that changes may be made therein without departing from the scope and spirit of the invention as defined in the appended claims.

The invention having been described, the following is claimed:

1. An aircraft propeller assembly comprising a propeller hub adapted to be driven by a turbine engine on an aircraft, said hub supporting a plurality of angularly disposed and radially projecting adjustable pitch propeller blades, pitch changing means including a hydraulic fluid cylinder and piston for changing the pitch of said blades between a feather position and a reverse pitch position through a low pitch in-flight idle position and a lower pitch on-ground idle position in response to actuation of said piston by hydraulic fluid, feedback control means including a valve for controlling the flow of the fluid to said piston, a plurality of feedback control rods extending parallel to the propeller axis of rotation and having rearward end portions connected to actuate said valve, first positive actuated means for moving said control rods and closing said valve in response to axial movement of said piston and rotation of said blades to said in-flight idle position, second positive actuated means for moving said control rods and closing said valve in response to further axial movement of said piston and rotation of said blades to said on-ground idle position, and means for precisely adjusting said first and second positive actuated means for precisely selecting the pitch of said blades at said in-flight idle position and said on-ground idle position.

2. An aircraft propeller as defined in claim 1 wherein said first positive actuated means comprise cam members supported for rotation in response changing the pitch of said propeller blades.

3. An aircraft propeller as defined in claim 2 wherein said first positive actuated means comprise a cam follower mounted on said control rods and disposed for engagement by said cam members.

4. An aircraft propeller as defined in claim 3 wherein said blades include outwardly projecting counterweight elements, and said cam members are mounted on said counterweight elements.

5. An aircraft propeller as defined in claim 3 wherein said cam follower is annular and surrounds said piston, said cam follower further including a corresponding plurality of ear portions projecting rearwardly toward said blades, and a roller mounted on each said ear portion for engagement by the corresponding said cam member.

6. An aircraft propeller as defined in claim 2 wherein said cam members each comprises a ramp surface extending to a curved surface having a generally uniform radius.

7. An aircraft propeller as defined in claim 1 wherein said means for precisely adjusting said first and second positive actuated means are externally of said hub.

8. An aircraft propeller as defined in claim 1 and including a solenoid connected to actuate said valve, and switch means for actuating said solenoid in response to landing of the aircraft to provide for automatically opening said valve and resetting the pitch of said blades from said in-flight idle position to said on-ground idle position.

9. An aircraft propeller assembly comprising a propeller hub adapted to be driven by a turbine engine on an aircraft, said hub supporting a plurality of angularly disposed and radially projecting adjustable pitch propeller blades, pitch changing means including a hydraulic fluid cylinder and piston for changing the pitch of said blades between a feather position and a reverse pitch position through a low pitch in-flight idle position and a lower pitch on-ground idle position in response to actuation of said piston y hydraulic fluid, feedback control means including a valve for controlling the flow of the fluid to said piston, a plurality of axially extending feedback control rods connected to actuate said valve, means for moving said rods axially in response to axial movement of said piston to said on-ground idle position, reset means including cam members supported for rotation in response to predetermined rotation of corresponding said blades, and cam follower means mounted on said control rods and disposed for engagement by said cam members for moving said rods and closing said valve in response to rotation of said blades to said in-flight idle position to provide for precisely resetting the pitch of said blades to said on-ground idle position by said piston after landing of the aircraft.

10. An aircraft propeller as defined in claim 9 wherein said blades include outwardly projecting counterweight elements, and said cam members are mounted on said counterweight elements.

11. An aircraft propeller as defined in claim 10 wherein said cam follower is annular and surrounds said piston, said cam follower further including a corresponding plurality of ear portions projecting rearwardly toward said blades, and a roller mounted on each said ear portion for engagement by the corresponding said cam member.

12. An aircraft propeller as defined in claim 10 and including means for precisely adjusting each of said cam members in a generally circumferential direction on said counterweight elements.

13. An aircraft propeller as defined in claim 10 wherein said cam members each comprises a ramp surface extending to a curved surface having a generally uniform radius.

14. An aircraft propeller as defined in claim 9 and including a solenoid connected to actuate said valve, and switch means for actuating said solenoid in response to landing of the aircraft to provide for automatically resetting the pitch of said blades from said in-flight idle position to said on-ground idle position.

15. An aircraft propeller assembly comprising a propeller hub adapted to be driven by a turbine engine on an aircraft, said hub supporting a plurality of angularly disposed and radially projecting adjustable pitch propeller blades, pitch changing means including a hydraulic fluid cylinder and piston for changing the pitch of said blades between a feather position and a reverse pitch position through a low pitch in-flight idle position and a lower pitch on-ground idle position in response to actuation of said piston by hydraulic fluid, each said blade including an outwardly projecting counterweight element, feedback control means including a valve for controlling the flow of the fluid to said piston, a plurality of axially extending feedback control rods connected to actuate said valve, means for moving said rods axially in response to axial movement of said piston to said on-ground idle position, reset means including cam members mounted on said blades for corresponding rotation with said blades, and an annular cam follower mounted on said control rods and surrounding said piston for engagement by said cam members for moving said rods and closing said valve in response to rotation of said blades to said in-flight idle position to provide for precisely resetting the pitch of said blades to said on-ground idle position by said piston after landing of the aircraft.

16. An aircraft propeller as defined in claim 15 and including means for precisely adjusting each of said cam members in a generally circumferential direction on said counterweight elements.

17. An aircraft propeller as defined in claim 15 wherein said cam members each comprises a ramp surface extending to a curved surface having a generally uniform radius.

18. An aircraft propeller as defined in claim 15 and including a solenoid connected to actuate said valve, and switch means for actuating said solenoid in response to landing of the aircraft to provide for automatically resetting the pitch of said blades from said in-flight idle position to said on-ground idle position.

* * * * *